(12) United States Patent
Menozzi et al.

(10) Patent No.: US 11,769,262 B2
(45) Date of Patent: Sep. 26, 2023

(54) TECHNIQUES FOR ACCURATE POSE ESTIMATION

(71) Applicant: Applied Research Associates, Inc., Albuquerque, NM (US)

(72) Inventors: Alberico Menozzi, Raleigh, NC (US); Chris F. Argenta, Cary, NC (US); James B. Cook, Apex, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 17/833,196

(22) Filed: Jun. 6, 2022

(65) Prior Publication Data

US 2022/0383524 A1 Dec. 1, 2022

Related U.S. Application Data

(63) Continuation of application No. 16/380,508, filed on Apr. 10, 2019, now Pat. No. 11,354,812, which is a continuation of application No. 15/704,962, filed on Sep. 14, 2017, now Pat. No. 10,430,954, which is a
(Continued)

(51) Int. Cl.
| | |
|---|---|
| *G06F 3/01* | (2006.01) |
| *G06T 19/00* | (2011.01) |
| *G06T 7/33* | (2017.01) |
| *G06F 1/16* | (2006.01) |
| *G02B 27/01* | (2006.01) |
| *G02B 27/00* | (2006.01) |
| *G01C 21/16* | (2006.01) |
| *G06T 11/00* | (2006.01) |
| *G06F 3/04817* | (2022.01) |

(Continued)

(52) U.S. Cl.
CPC ............ *G06T 7/33* (2017.01); *G01C 21/1654* (2020.08); *G01C 21/1656* (2020.08); *G02B 27/0093* (2013.01); *G02B 27/017* (2013.01); *G06F 1/163* (2013.01); *G06F 3/011* (2013.01); *G06F 3/04817* (2013.01); *G06F 11/00* (2013.01); *G06T 5/20* (2013.01); *G06T 11/00* (2013.01); *G06T 19/006* (2013.01); *G02B 2027/0138* (2013.01); *G02B 2027/0141* (2013.01); *G02B 2027/0181* (2013.01); *G06F 3/01* (2013.01); *G06T 2200/24* (2013.01)

(58) Field of Classification Search
CPC .............................. G06T 19/006; G06F 3/011
See application file for complete search history.

(56) References Cited

PUBLICATIONS

Roberts, et al. "Testing and evaluation of a wearable augmented reality system for natural outdoor environments." SPIE defense, Security, and Sensing. International Society for Optics and Photonics, May 2013, pp. 1-16.*

* cited by examiner

*Primary Examiner* — Matthew Salvucci
(74) *Attorney, Agent, or Firm* — Erise IP, P.A.

(57) ABSTRACT

The described technology regards an augmented reality system and method for estimating a position of a location of interest relative to the position and orientation of a display, including receiving and selectively filtering a plurality of measurement vectors from a rate-gyroscope. Systems of the described technology include including a plurality of sensors, a processing module or other computation means, and a database. Methods of the described technology use data from the sensor package useful to accurately render graphical user interface information on a display.

20 Claims, 7 Drawing Sheets

Related U.S. Application Data continuation of application No. 14/832,492, filed on Aug. 21, 2015, now Pat. No. 9,767,576.

(60) Provisional application No. 62/040,600, filed on Aug. 22, 2014.

(51) Int. Cl.
*G06T 5/20* (2006.01)
*G06F 11/00* (2006.01)

TECHNIQUES FOR ACCURATE POSE ESTIMATION

CROSS REFERENCE TO RELATED APPLICATIONS

This application is a continuation application, and claims priority benefit with regard to all common subject matter of U.S. patent application Ser. No. 16/380,508, filed Apr. 10, 2019, and entitled "TECHNIQUES FOR ACCURATE POSE ESTIMATION," which is now U.S. Pat. No. 11,354,812, issued Jun. 7, 2022, ("the '812 Patent"). The '812 Patent is a continuation application, and claims priority benefit with regard to all common subject matter of U.S. patent application Ser. No. 15/704,962, filed Sep. 14, 2017, and entitled "TECHNIQUES FOR ACCURATE POSE ESTIMATION," which is now U.S. Pat. No. 10,430,954, issued Oct. 1, 2019, ("the '954 Patent"). The '954 Patent is a continuation application, and claims priority benefit with regard to all common subject matter, of U.S. patent application Ser. No. 14/832,492, filed Aug. 21, 2015, and entitled "TECHNIQUES FOR ACCURATE POSE ESTIMATION IN OUTDOOR ENVIRONMENTS," which is now U.S. Pat. No. 9,767,576, issued Sep. 19, 2017, ("the '576 Patent"). The '576 Patent claims priority benefit of U.S. Provisional Application Serial No. 62/040,600, filed Aug. 22, 2014. The above-identified, earlier-filed patents and patent application are hereby incorporated by reference in their entirety into the present application.

STATEMENT REGARDING FEDERALLY SPONSORED RESEARCH OR DEVELOPMENT

The inventions herein disclosed were made with government support under Federal Contract No. FA8650-09-C-7909, awarded by DARPA (Defense Advanced Research Projects Agency). The government has certain rights to the inventions described in this application.

BACKGROUND OF THE TECHNOLOGY

The described technology regards vision-aided navigation, and in particular pose estimation useful in vision aided navigation, advantageous in wearable augmented-reality (AR) systems operating in natural outdoor environments and other applications.

While a variety of GPS/INS solutions achieve pose estimation, currently available solutions do not offer the level of customization needed for a person walking over arbitrary outdoor environments. The systems and methods of the described technology take advantage of kinematics constraints, and detection of magnetic and dynamic disturbances, to achieve enhanced accuracy. Further, the use of digital terrain and elevation data (DTED) information allows systems of the described technology to provide a stable measurement of altitude with measurements of absolute orientation, systems incorporating the described technology reach levels of performance that are not possible with other GPS/INS systems.

GENERAL DESCRIPTION

The described technology regards pose estimation systems useful in augmented-reality systems and other technology, including a plurality of sensors, a processing module or other computation means, and a database.

The plurality of sensors or sensor package may include sensors such as a camera, a 3-axis accelerometer, a 3-axis angular rate gyro, a 3-axis magnetometer, a barometric pressure sensor, and a GPS receiver, and may be mounted to a rigid reference assembly. Data from the sensor package, which could include delayed measurements, is transmitted to the processing module or other computation means, which generates signals that render graphical user interface information on a display using the sensor data. The processing module also is communicatively coupled with, and uses information from a database, which receives, stores, and transmits data such as locations of interest in geodetic coordinates (latitude, longitude, altitude), and digital terrain and elevation data. The database may be local to the processing module, virtual, stored on a single or network of remote servers, on the Internet or otherwise accessible to the processing module.

The data received by the processing module may include time-stamped sensor values such as camera imagery, accelerometer measurements, rate-gyro measurements, magnetometer measurements, barometric pressure sensor measurements, GPS receiver position measurements, and GPS receiver velocity measurements. From this data and data representing the spatial position of a display relative to the spatial position of the sensors, the processing module calculates over time a position vector representing the current estimated position of a location of interest with respect to the position and orientation, such as the orientation, geodetic position (longitude, latitude, altitude), or combination thereof, of the display, expressed in display coordinates. In some embodiments the position vector derives from the sensor values received by the processing module, using an Extended Kalman Filter (EKF) structure based on a retroactive update to a previously rendered pose estimate stored in a rewind buffer, or a forward buffer to store current and predicted pose estimates calculated by the processing module, for example by means of circuitry, firmware and/or a processor. Each delayed measurement may be stored in the rewind buffer and processed using a separate sequential update. In some embodiments the processing module detects the presence of magnetic disturbances and, if detected, rejects magnetometer measurements corresponding to magnetic disturbances. In some embodiments the calculation of the position vector uses an EKF structure having an adjust-update-predict (AUP) cycle, which adjusts the previous prediction pose values by including the effects of current input data in addition to current measurement data to estimate the current state.

The processing module then generates signals to render on a display, at a position derived from the position vector, graphical user interface information including a graphical icon representing the location of interest. The processing module may implement a baseline GPS/INS to calculate the position vector, and may adjust the baseline GPS/INS with absolute orientation information when available.

Some embodiments of the described technology further include a radio to send and receive geo-spatial data relating to objects in the environment. The processing module receives, stores and uses such geo-spatial data, and generates signals to render graphical user interface information on a display such as a graphical icon representing some of the objects in the environment at a position derived from the position vector. In some embodiments of the described technology a rate-gyro measurement vector received by the processing module is selectively filtered by the processing module based on its magnitude.

The described technology further regards a method for providing an estimate of position for a location of interest relative to a display. The method includes the steps of receiving sensor data from a plurality of sensors which may include delayed data measurements and data representing the pose of a display, and applying an Extended Kalman Filter (EKF) to the received data and the geodetic coordinates of a location of interest, to estimate a pose of the display from which a position of the location of interest relative to the pose of the display may be calculated. The EKF may facilitate a retroactive update to a previously rendered pose estimate stored in a rewind buffer. In some embodiments of the described technology the EKF may also or alternatively use a forward buffer to store current and predicted state estimates. In some embodiments the method includes receiving a plurality of measurement vectors from a rate-gyroscope, and selectively filtering the measurement vectors based on a magnitude of each of the measurement vectors; a position state estimate may then be generated based upon the filtered measurement vectors and other received data. In some embodiments the method applies an Extended Kalman Filter (EKF) to the received data and geodetic coordinates of a location of interest, to estimate the position of the location of interest relative to the pose of the display, based upon a retroactive adjustment of a previously rendered pose estimate using the delayed data measurements, a recalculation of the estimated position of the location of interest relative to the pose of the display, and a prediction of future pose estimates by means of an adjust-update-predict (AUP) cycle.

The disclosed technology also regards a pose estimation system for use with a display, including means for receiving sensor data from a plurality of sensors comprising delayed data measurements and data representing the spatial position and orientation and orientation of a display, and means for applying an Extended Kalman Filter (EKF) to the received data and geodetic coordinates of a location of interest, to estimate a position of the location of interest relative to the pose of the display. The estimation may be based on a retroactive update to a previously rendered pose estimate stored in a rewind buffer, using delayed sensor values. The estimation may also or alternatively use a forward buffer to store current and predicted state estimates. The disclosed technology may also include means for receiving a plurality of measurement vectors from a rate-gyroscope, and selectively filtering the measurement vectors based on a magnitude of each of the measurement vectors, wherein the means for generating a position state estimate is based on the filtered measurement vectors and other received data. In some embodiments of the disclosed technology the estimation of the position of the location of interest may be based upon a retroactive adjustment of a previously rendered pose estimate of the display using the delayed data measurements, a recalculation of the estimated position, and a prediction of future positions by means of an adjust-update-predict (AUP) cycle.

The disclosed technology also regards one or more tangible computer-readable storage media encoding computer-executable instructions for executing on a computer system a computer process of modifying an extended Kalman Filter (EKF) prediction of a position and orientation of a display with an adjustment based upon filtered measurement vectors received from a gyroscope. The predicted position and orientation of the display may then be used by the computer process to calculate the position of a location of interest relative to the estimated position and orientation of the display.

In an application of the described technology, a user can quickly orient himself and initiate movement as his next waypoint is automatically rendered in his environment as seen through the display (along with additional pertinent information), rather than having to study his map or check his compass. The user's azimuth, current position and objective destination may be constantly displayed. If asked to report his location, the user can give a status update without stopping or otherwise taking his attention away from his current field of view. If the user encounters an obstacle to movement, he can easily detour or bypass the obstacle without losing his orientation to the movement objective. His next waypoint, or other icon of interest, serves as a directional beacon regardless of occlusions to his view or obstacles to his forward progress.

Similarly, in a military application, soldiers are often required to effectively manage airspace for numerous aircraft and to orchestrate aircraft movement in support of ground forces and sensor assets. Some mission profiles mandate unaided visual acquisition of an aircraft. Aircraft that broadcast their location can be geo-referenced by the described technology, even if the aircraft is out of visual range. Once in visual range, finding the aircraft can still be very challenging due to occlusions (e.g., clouds, terrain) or other sensory challenges (e.g., acoustic multi-path effects). The described technology enables rapid acquisition by the soldier of the locations of aircraft assets and provides immediate understanding of aircraft attributes (e.g., call sign, altitude).

DRAWINGS

FIGS. 1A, 1B and 1C depict example embodiments of the system of the described technology.

DETAILED DESCRIPTION

Figure 1C:
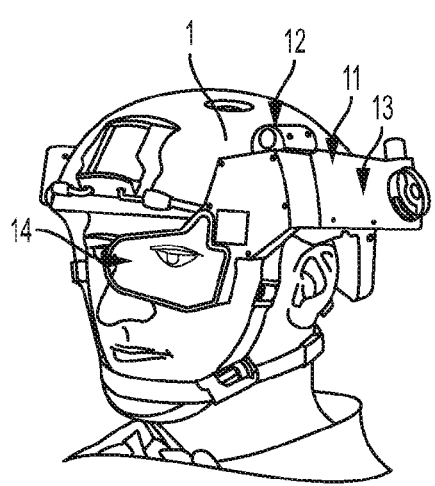
Figure 1C:
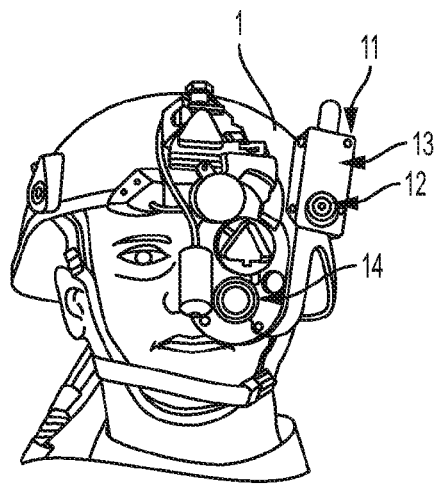
Figure 1C:
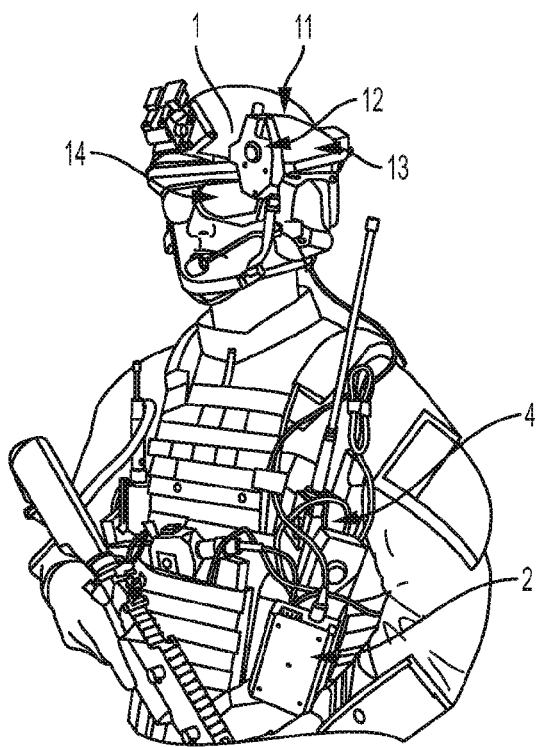
Figure 2:
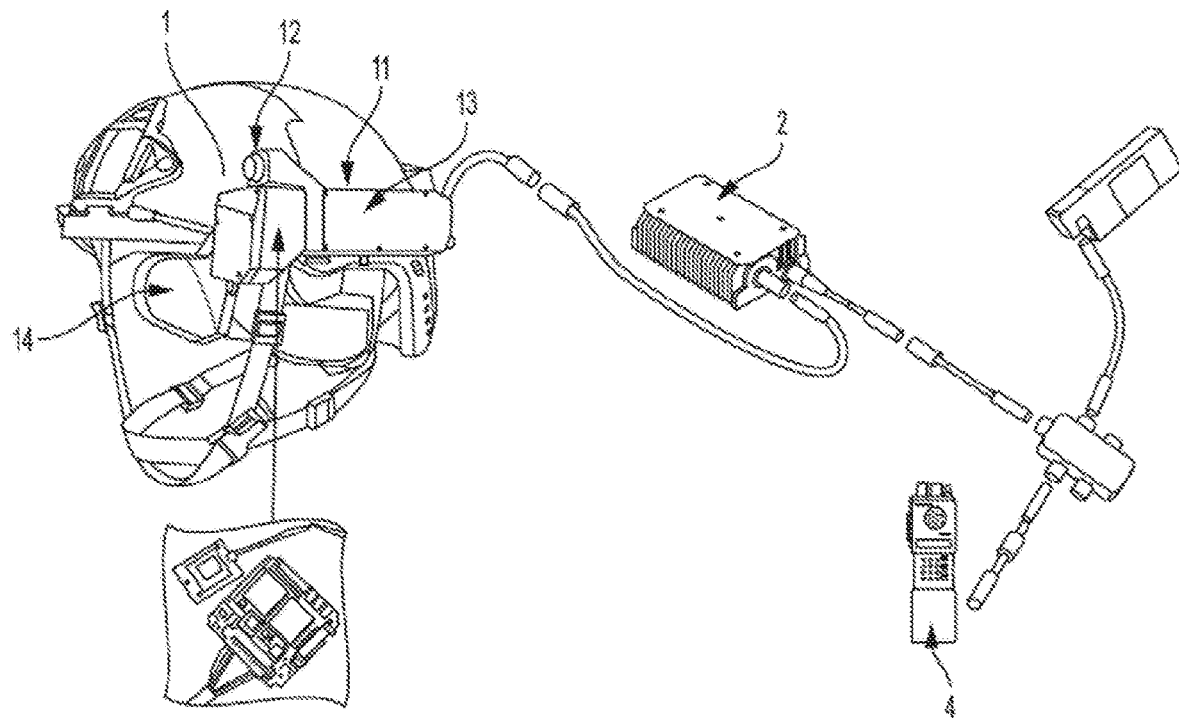
FIG. 2 is a peripheral view of an example embodiment of the system of the described technology.
Figure 7:
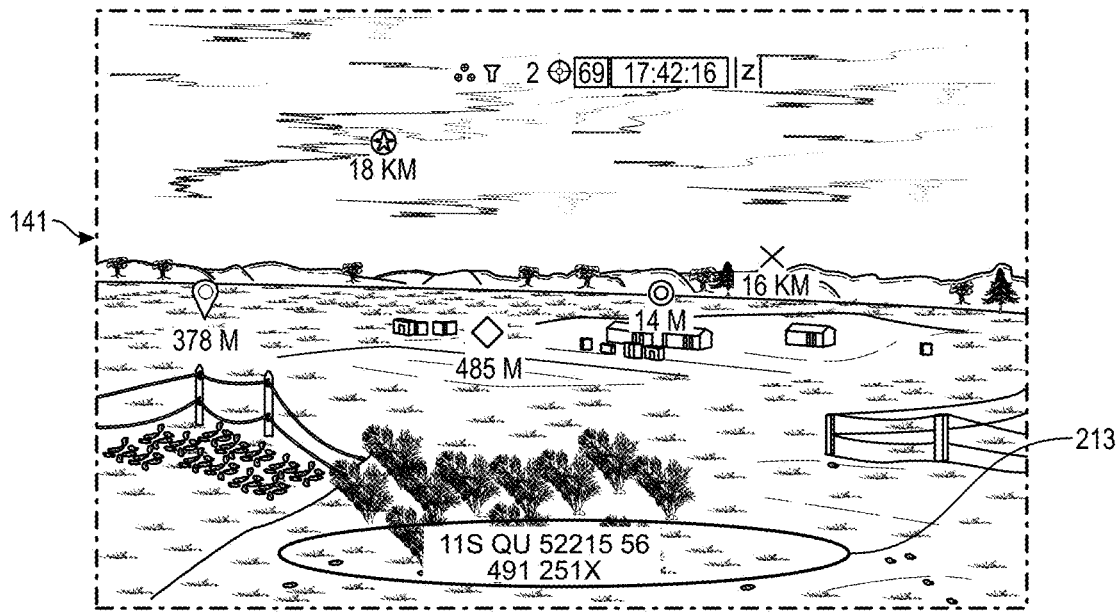
FIG. 7 shows an example embodiment of the user interface/display of the described technology.

The augmented reality system of the described technology comprises in some embodiments a motion sensing and visualization kit 1, an augmented-reality processing module 2 with a database 3, and may include a radio 4, as depicted in FIG. 1C and FIG. 2. The database may be remote from the visualization kit and the processing module As shown in the embodiment of the described technology depicted in FIGS. 1A, 1B and 1C and FIG. 2, the motion sensing and visualization kit 1 may include a rigid reference assembly 11 with a camera (high-speed and high-resolution) 12 and a sensor package 13, and having a display 14 with a graphical user interface 141 rendered on the display to convey information in the form of text and graphics, an embodiment of which is shown in FIG. 7. In some embodiments of the system of the described technology the display 14 is see-through. The sensors and processing module of the described technology can function with a wide variety of displays, including by example and without limitation see-through displays manufactured by the BAE, Lumus, and SA Photonics.

Figure 3:
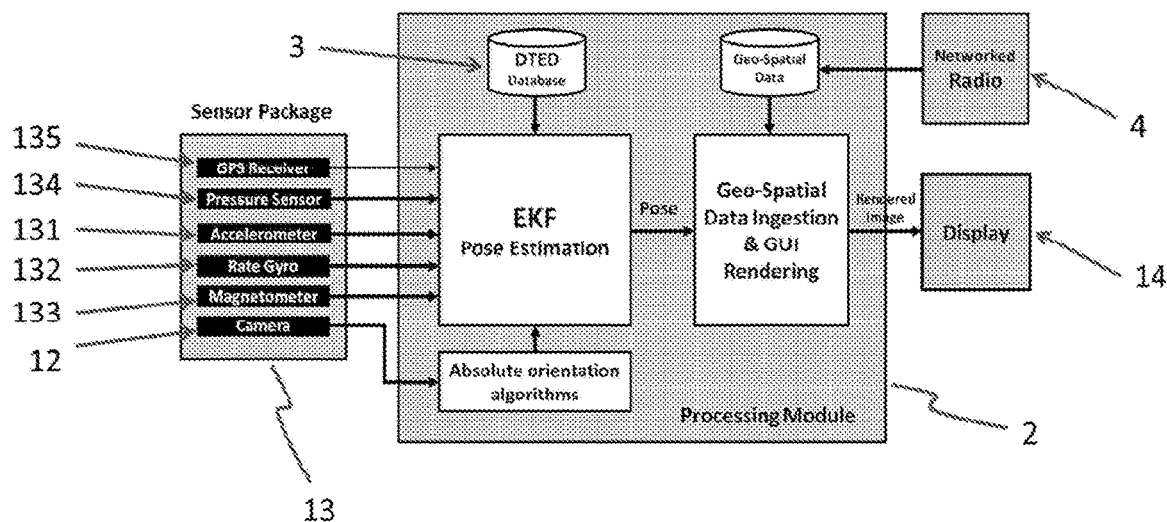
FIG. 3 is a block diagram of the sensor package and the processing module of an example embodiment of the described technology.

As depicted in FIG. 3, the sensor package 13 includes a plurality of sensors, including a 3-axis accelerometer 131, a 3-axis angular-rate gyro 132, a 3-axis magnetometer 133, a barometric pressure sensor 134, a GPS receiver 135 and a camera 12. The sensors may be mounted to the rigid reference assembly as a packaged unit. While described as a package, the sensors may be individually positioned about the rigid reference assembly 11 or on the user's clothing or other equipment, in accordance with the technology as herein described. In some embodiments the rigid reference assembly is a helmet.

The sensors 13 are in wired communication (via a cable, or other hard wire) or wireless communication (via Bluetooth or other wireless communication means) with the processing module 2 or other computation means of the described technology. As hereinafter described, the processing module processes data from the sensors and data from a database to generate display pose, and renders tactically-relevant information on the motion sensing and visualization kit's display 14. In some embodiments the processing module is carried on the user's body when the system is in operation. Coupled with the processing module is a database 3 including the geodetic coordinates of locations of interest (longitude, latitude and altitude), and digital terrain and elevation data (DTED) to aid in the estimation of altitude. The processing module may further include custom software and standard libraries to receive geo-spatial data (i.e., latitude, longitude and altitude information about objects in the environment) via a radio network or otherwise, and software to render this data to a GUI 141.

The processing module or other computation means may be in wired communication (via a cable, or other hard wire) or wireless communication (via Bluetooth, or other wireless communications means) with the display 14. The processing module may also be coupled by wire or wireless communication with the radio 4, which receives signals relating to data in the database, and supports receiving and parsing XML-based messages from a digital radio network.

Further, as shown in FIG. 7, the user interface/display 141 may provide operational alerts (e.g., notification that the radio network is inoperable, that the system is magnetically-disturbed, or the GPS signal is denied or degraded), system status information (e.g., user interface mode ID, system battery level, operational time), system settings menu access, iconic visualization of geo-registered points of interest, and a situational awareness ring 213. A menu may not be displayed until activated by the user via a button/toggle switch located on or coupled with the motion sensing and visualization kit 1; with the menu, the user may access and change system configuration settings. The situational awareness ring shown in FIG. 7 is an intuitive tool that offers the user in a military application a dynamic real-time 360° understanding of where friendlies, enemies and other points of interest are located. At the center of the grid is the user's Military Grid Reference coordinate; located above the ring is the user's heading (on the fly configurable as magnetic or true). Icons may move around the ring in response to user rotation. Geo-registered icons and those on the situational awareness ring are displayed in some embodiments with range information from the user, and in some cases elevation (for aircraft icons). One or more batteries may power various components of the system of the described technology.

Suitable hardware for use in the processing module 2 include embedded processing modules with, for example, an NVidia Tegra 3 system-on-chip and DDR3L memory. Similar suitable hardware may be found in current cell-phone quad-core computing platforms.

Over time, in periodic intervals, the sensors of the sensor package 13 measure various conditions, and transmit time-stamped signals representing the measurements to the processing module 2. Specifically, the accelerometer 131 provides a measure $y_a$ of the difference between linear acceleration of the sensor and the Earth's gravity vector, the rate gyro 132 provides a measure $u_g$ of angular rate, the magnetometer 133 provides a measure $y_m$ of the Earth's magnetic field to help in determining azimuth, and the barometric pressure sensor 134 provides a measure $y_{bp}$ of barometric pressure for estimating altitude. Similarly, the GPS receiver 135 provides its position data $y_{Gp}$ (latitude, longitude, and altitude) and its velocity data $y_{Gv}$ (North, East, and Down velocities).

The processing module 2 or other computation means receives measurements from the sensors 13, and calculates over time the position vector of a location of interest s relative to the pose of the display 14.

The vector of the location of interest s calculated by the processing module is referred to as vector $r_{dis}^d$, representing the current estimated position of s relative to the pose of the display, expressed in display coordinates. The calculations are based upon an Extended Kalman Filter (EKF) structure, performed by an "EKF Calculator" stored in memory and executable by a processor to calculate state predictions. The EKF Calculator may include software and/or hardware elements, and may be implemented in any tangible computer-readable storage media. "Tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The Extended Kalman Filter (EKF) is a method for estimating a set of quantities describing a system, referred to as system states, given a set of measurements and a pair of mathematical models. The measurements include system data, typically collected by sensors as the system operates.

The first mathematical model, referred to as the process model, describes the evolution of the system states over time. The second mathematical model, referred to as the measurement model, describes how the measurement data is related to the states. Being only an approximation, each model must include a measure of its uncertainty, which the EKF uses to produce an estimate of the system states from the information at hand. It does so by starting from initial estimates of the system states and their uncertainty, valid at some initial time $t_0$, and using the process model to produce new estimates, called the prediction, valid at some later time $t_1$ when measurement data is also available. At time $t_1$, the new information provided by the measurement data, weighted using the measurement model, is used to make an update to the prediction, resulting in the final estimates of the system states and their uncertainty at $t_1$. This prediction-update cycle continues as long as measurement data is available, producing estimates of system states and associated uncertainty along the way.

In some embodiments of the described technology the EKF structure includes a rewind buffer to integrate delayed measurements, or a forward buffer to store current and predicted state estimates calculated by the processing module, or both. Using the vectors $r_{ds}^{d}$ calculated by the processing module, the processing module 2 or other computation means generates signals to render graphic symbology on the display 14, corresponding to the location of interest s, that appears to the user to be attached to that real-world location (i.e., geo-registered). In some embodiments the system uses DOD-standard MIL-STD-2525C symbology, which distinguishes between hostile, friendly, neutral and unknown symbols based on shape and color.

Specifically, the processing module 2 or other computation means of the described technology implements a baseline GPS/INS, and aids it with vision-based and other non-inertial absolute orientation information when available. The baseline GPS/INS is designed to provide a nominal level of performance when vision-aiding and other measurements are not available, and integrate them when available for improved performance, without assumptions about their availability or periodicity. The system of the described technology may further utilize measurements and computer processes and analysis to address latency and enhance robustness of the system in the presence of magnetic or dynamic disturbances, as hereinafter described.

The EKF structure used in the processing module 2 of the described technology further accommodates and aligns time-delayed measurements using a buffer scheme. In some embodiments the processing module selectively filters the rate-gyro measurement vector $u_g$ transmitted to the processing module, based on the magnitude of the vector $u_g$. In some embodiments the processing module of the described technology augments the standard predict-update cycle of the EKF process with an additional step to reduce prediction error and improve responsiveness to rate gyro and accelerometer inputs, as hereinafter described.

By means of the processing module 2 or other computation means and associated standard libraries accessible thereby, the GUI 141 renders a situational awareness ring 21 and one or more icons on the display representing positions of locations of interest, using the vector $r_{ds}^{d}$.

Figure 4:
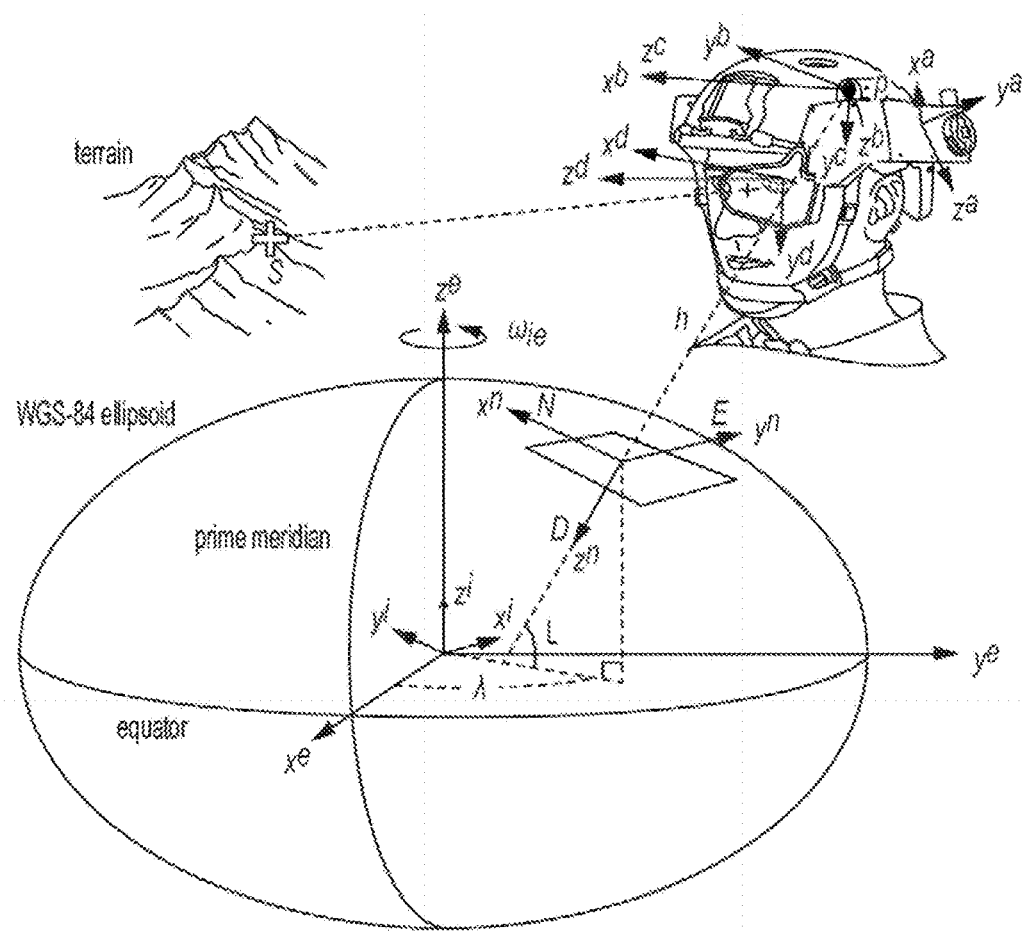
FIG. 4 shows the various coordinate systems useful in the described technology.

Various coordinate systems are involved in the calculations of the described technology, as depicted in FIG. 4. The body coordinate system b is the reference for the motion sensing and visualization kit 1, with origin at the point p. The camera coordinate system c consists of a permutation of the body coordinate system's axes and shares the same origin. The display coordinate system d and the accelerometer coordinate system a are both rigidly attached to the body coordinate system. Coordinate system a is the reference for the motion sensing and sensors. Coordinate system n is the North-East-Down (NED) reference for navigation. The Earth-Centered Earth-Fixed (ECEF) coordinate system e is used to specify points in the environment. Coordinate system i is the Earth Centered Inertial (ECI) coordinate system, which is a good approximation of a true inertial reference in the context of the described technology. The WGS-84 ellipsoid is used as the world model.

The processing module calculates the position vector $r_{ds}^{d}$ of a point s in the environment with respect to the origin of d, expressed in d coordinates, using the formula:

$$r_{ds}^{d} = (C_n^e C_b^n C_d^b)^T [r_{es}^{e} - (r_{ep}^{e} + C_n^e C_b^n r_{pd}^{b})]$$

wherein $r_{pd}^{b}$ is the position of the origin of d with respect to p, expressed in b coordinates, obtained from physical measurements on the actual system or measurements on its solid-model drawing equivalent.

$r_{es}^{e}$ is the position vector of a point s in the environment with respect the origin of e, expressed in e coordinates, obtained by converting the known latitude, longitude, and altitude of the point s from the database into equivalent Cartesian coordinates.

$r_{ep}^{e}$ is the position of p with respect to the origin of e, expressed in e coordinates, obtained by converting the latitude, longitude, and altitude of the point p into equivalent Cartesian coordinates. The latitude, longitude, and altitude of the point p are estimated by the system's EKF using sensor data, as hereinafter described.

The position vectors of points s ($p_s$) and p ($p_p$) with respect to the origin of e are specified in terms of latitude, L, longitude, $\lambda$, and altitude, h. The position vector $p_s$ is stored in the database 3; the position vector $p_p$ is calculated using the method as hereinafter described. The conversion from latitude, longitude, and altitude coordinates into their Cartesian equivalents is performed by the processing module of the described technology, by the mapping:

$$x^e = (R_N(L) + h) \cos L \cos \lambda$$

$$y^e = (R_N(L) + h) \cos L \sin \lambda$$

$$z^e = [1 - e^2)(R_N(L) + h)] \sin L$$

wherein $R_N$ (L) and e are WGS-84 ellipsoid parameters.

$C_n^e$ represents the orientation of the North-East-Down (n) coordinate system (see FIG. 4) with respect to the Earth-Centered Earth-Fixed (e) coordinate system, obtained from a known coordinate transformation that is a function of latitude, longitude, and altitude of the point p. The latitude, longitude, and altitude of the point p are estimated by the system's EKF using sensor data.

$C_b^n$ represents the orientation of the body coordinate system (b) (see FIG. 4) with respect to the North-East-Down (n) coordinate system.

$C_b^n$ is estimated by the system's EKF using sensor data.

$C_d^b$ represents the orientation of the display coordinate system (d) with respect to the body coordinate system (b) obtained from a-priori calibration based upon alignment of features in an image acquired by the camera and expressed in body coordinates with corresponding features in the same image expressed in display coordinates.

Once $C_b^n$ and $p_p$ are estimated using the system's EKF, the processing module 2 renders the GUI information on the display 14 so that an icon representing the position s can be rendered at display coordinates $r_{ds}^d$.

The EKF used in the processing module 2 of the described technology is based upon the general model:

$$\frac{dx}{dt} = f(x, u, w, t)$$

$$\hat{y}_k = h_k(x_k, v_k)$$

where t is time, f is a continuous-time process, $h_k$ is a discrete-time measurement (with output $\hat{y}_k$), x is the state vector, $x_k$ is its discrete-time equivalent, and u is the input vector. The vector w is a continuous-time zero-mean white noise process with covariance Q (denoted as w~N(0,Q)) and $v_k$ is a discrete-time zero-mean white-noise process with covariance $R_k$ (denoted as $v_k$~N(0,$R_k$)).

The state is defined as $x=[p_p; v_{ep}^n; q_{nb}; b_g; b_a]$ (semicolons are used to indicate column stacking), wherein $v_{ep}^n$ is the velocity of the point p with respect to the ECEF coordinate system, expressed in NED coordinates, and $q_{nb}$ is the quaternion representation of $C_b^n$. The vector $b_g$ is the rate-gyro bias, and the vector $b_a$ is the accelerometer bias. The rate gyro and accelerometer data are inputs to the process model, so that $u=[u_a; u_g]$, with $$u_a = f_{ip}^b + b_a + w_a$$

$$u_g = \omega_{ib}^b + b_g + w_g$$

where $f_{ip}^b = (C_b^n)^T [a_{ep}^n - g^n + (\omega_{en}^n + 2\omega_{ie}^n) \times v_{ep}^n]$ is the specific force at p, $\omega_{ib}^b$ is the angular rate of the body coordinate system with respect to the ECI coordinate system (i), $\omega_{en}^n$ is the angular rate of n coordinate system with respect to the e coordinate system (expressed in n coordinates), $\omega_{ie}^n$ is the angular rate of the e coordinate system with respect to the i coordinate system (also expressed in n coordinates), $w_a$~N(0,$Q_a$) and $w_g$~N(0,$Q_g$). The cross product in the $f_{ip}^b$ expression is a Coriolis and centripetal acceleration term due to motion over the Earth's surface, and can be neglected when the velocity is small (which is the case for pedestrian navigation).

Using the state definition and input model described above, the process model is specified by the following equations:

$$\dot{p}_p = f_p(x) + w_p$$

$$\dot{v}_{ep}^n = C_b^n(u_a - b_a - w_a) + g^n - (\omega_{en}^n + 2\omega_{ie}^n) \times v_{ep}^n + w_v$$

$$\dot{q}_{nb} = \frac{1}{2}\Omega(q_{nb})(u_g - b_g - w_g - \omega_{in}^b) + w_q$$

$$\dot{b}_g = w_{b_g}$$

$$\dot{b}_a = w_{b_a}$$

where $$f_p = \begin{bmatrix} \frac{1}{R_M(L)+h} & 0 & 0 \\ 0 & \frac{1}{(R_N(L)+h)\cos L} & 0 \\ 0 & 0 & -1 \end{bmatrix} v_{ep}^n,$$

$R_M$ and $R_N$ are WGS-84 parameters, $g^n$ is the acceleration due to gravity, $\Omega$ is a 4×3 matrix that transforms an angular rate vector into the corresponding quaternion derivative, and $\omega_m^b = (C_b^n)^T (\omega_{ie}^n + \omega_{en}^n)$. The process noise vector is $w=[w_p;$ $w_v; w_q; w_g; w_{b_g}; w_a; w_{b_a}]$, and its covariance matrix is Q=blkdiag ($Q_p, Q_v, Q_q, Q_g, Q_{b_g}, Q_a, Q_{b_a}$). The measurement vector is defined as:

$$\hat{y}_k = \begin{bmatrix} \hat{y}_{AO} \\ \hat{y}_a \\ \hat{y}_m \\ \hat{y}_{Gv} \\ \hat{y}_{Gp} \\ \hat{y}_D \end{bmatrix} = \begin{bmatrix} q_{nb} + v_{AO} \\ (C_b^n)^T(a_{ep}^n - g^n) + b_a + v_a \\ (C_b^n)^T m^n + v_m \\ v_{ep}^n + v_{Gv} \\ p_p + v_{Gp} \\ h + v_D \end{bmatrix}$$

where $\hat{y}_{AO}$ is an absolute orientation measurement, $\hat{y}_a$ is the accelerometer measurement, $\hat{y}_m$ is the magnetometer measurement, $\hat{y}_{Gv}$ is the velocity measurement, $\hat{y}_{Gp}$ is the GPS horizontal position (i.e., latitude and longitude) measurement, and $\hat{y}_D$ is the measurement of altitude based on DTED. The measurement noise vector is $v_k=[v_{AO}; v_a; v_m; v_{Gv}; v_{Gp}; v_D]$, and its covariance matrix is $R_k$=blkdiag ($R_{AO}, R_a, R_m, R_{Gv}, R_{Gp}, \sigma_D^2$).

Because of the block-diagonal structure of $R_k$, the EKF measurement update step is executed by processing measurements from each sensor as separate sequential updates (in the same order as they appear in the $\hat{y}_k$ vector above).

The gravity vector is approximated as being perpendicular to the WGS-84 ellipsoid and therefore modeled as $g^n=[0; 0; g_0 (L)]$, where the down component $g_0 (L)$ is obtained from the known Somigliana model. Since they are used as measurements of the gravity vector in body coordinates, accelerometer-based updates are only valid if the acceleration $a_{ep}^n$ is zero. If not, these measurements are considered to be corrupted by an unknown dynamic disturbance. However, this disturbance is addressed by detecting its presence and, consequently, increasing the corresponding measurement noise covariance matrix, $R_a$, by a large factor $\rho_a$ (e.g., $\rho_a$=100). Detection is based on comparing the norm of the accelerometer measurement to $\|g^n\|$, and also checking that the measured angular rate is lower than a threshold whose value is application dependent (e.g., 3°/sec. in certain conditions). In head-worn applications, the location of the sensor package on the motion sensing and visualization kit, and the corresponding kinematics due to head movement, result in angular rate being a very good indicator of $a_{ep}^n$. The approach of increasing $R_a$ implies that the unknown acceleration $a_{ep}^n$ is modeled as a stationary white noise process. Though the actual process is not stationary or white, it was found experimentally that this approach yields better results than the alternative of completely rejecting accelerometer measurements that are deemed disturbed. In fact, when testing this alternative, it was observed that a single valid measurement after long periods of dynamic disturbance (as in the case when walking) could cause undesirable jumps in the estimates of $b_g$ and $b_a$, while increasing $R_a$ resulted in no such issues.

Magnetometer-based measurement updates are valid if the magnetic field being measured is the Earth's magnetic field only. Otherwise, these measurements are considered to be corrupted by an unknown magnetic disturbance. Therefore the processing module or other computation means of the described technology may detect the presence of magnetic disturbances and, if detected, rejects the corresponding magnetometer measurements. Detection is based on comparing the norm of the measured magnetic field vector $y_m$, to the Earth's field strength $B_m$, as well as checking that the computed inclination angle is not too far (e.g., 0.5 deg) from the nominal value. Since it is based on the inner product $y_m^T y_a$, the latter check is only performed if no dynamic disturbance is detected.

Figure 5:
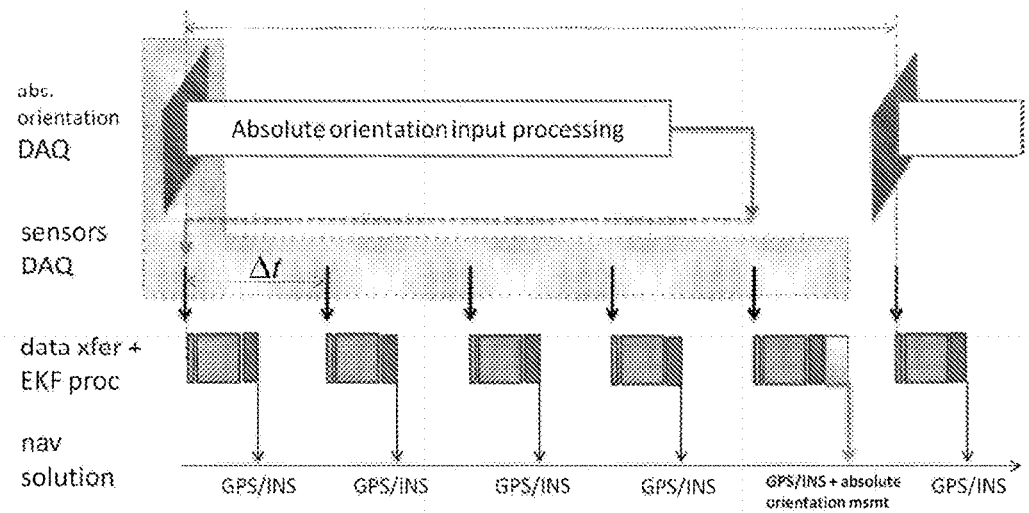
FIG. 5 is a qualitative timing diagram of the EKF processing of example embodiments of the described technology.
Figure 6:
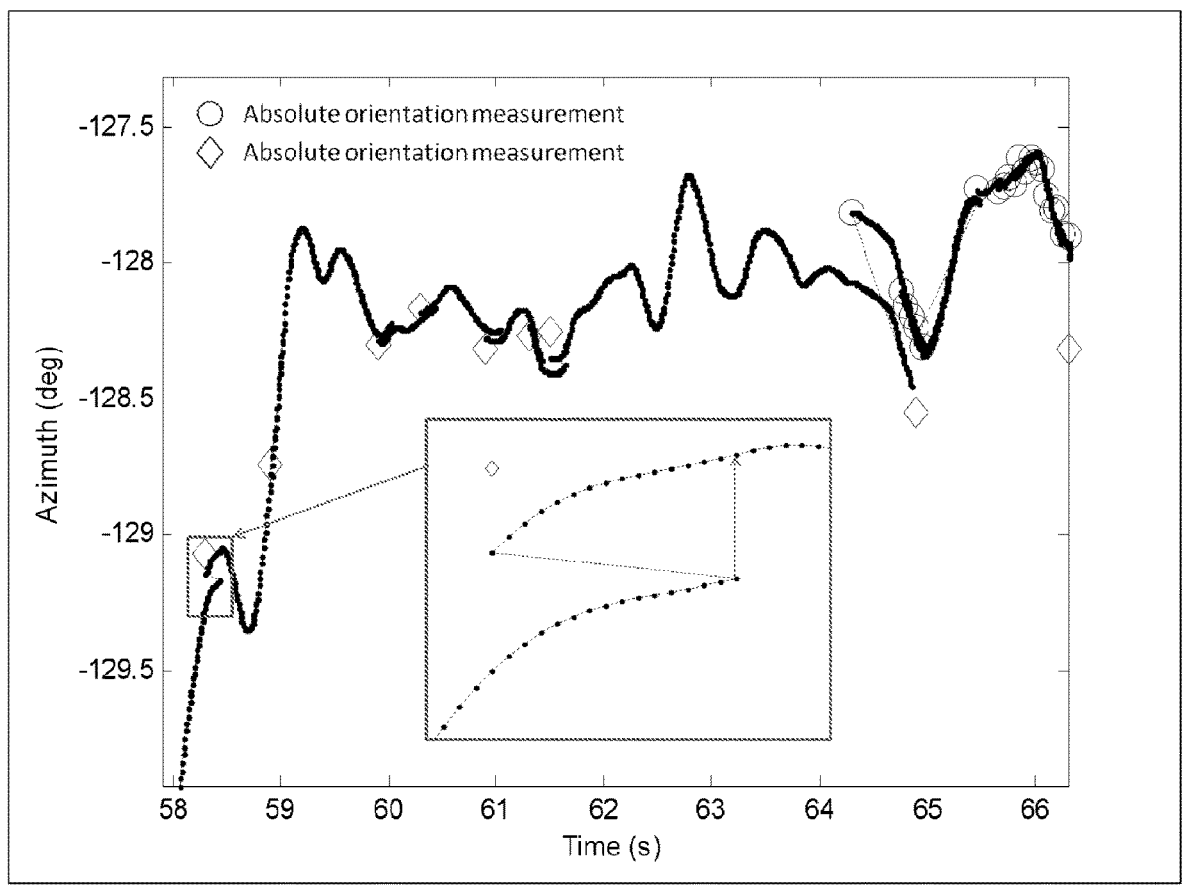
FIG. 6 shows a close-up look at an azimuth update based on a representative absolute orientation measurement useful in the system and methods of the described technology; as depicted in the inset of the figure, the EKF goes back in time using the rewind buffer to reprocess the azimuth estimate based on the delayed absolute orientation measurement.

The processing module or other computation means may use a circular rewind buffer (RB) to maintain a record of relevant information pertaining to the last $N_r$ samples of EKF processing. This is done to properly integrate absolute orientation measurements, which are delayed with respect to the rest of the data (as depicted in FIG. 5, a qualitative timing diagram of the EKF processing of the described technology). By this buffer, when absolute orientation information is processed and delivered, the EKF can reprocess past information. In the processing module 2 of the described technology the absolute orientation data acquisition is synchronized with the sensor data acquisition. This reprocessing of past data is handled within a single EKF epoch $\Delta t$. FIG. 6 shows a close-up look at an azimuth update based on a representative absolute orientation measurement. The EKF is able to "go back in time" and use the rewind buffer to reprocess the state estimate based on the late measurement, all within its regular processing interval. In the example illustrated in the inset in FIG. 6, the EKF goes back in time using the rewind buffer to reprocess the azimuth estimate of the pose of the display based on the delayed absolute orientation measurement.

The processing module may also or alternatively use a forward buffer (FB) to store both the current state estimate $x_k^+$ and the predicted state estimates up to $N_f$ time steps ahead. That is $FB_k = \{x_k^+, x_{k+1}^-, x_{k+2}^-, \ldots, x_{k+N_f}^-\}$. Through interpolation of the FB vectors, a state estimate can then be produced for any $t \in [t_k, t_k + N_f \Delta t]$ where $t_k$ is the time of the current estimate and $\Delta t$ is the EKF's processing interval. Given a value $\Delta t_d$ for system latency, the pose that is delivered at the time $t_k$ for rendering graphic on the display is based on the predicted state at $t = t_k + \Delta t_d$, which is extracted from the FB. $N_f$ must be selected such that $N_f > 0$ and $N_f \Delta t \geq \Delta t_d$. Focused experiments have shown a reduction in perceived latency from about 40 ms to about 2 ms when using this forward-prediction process.

Prior to use, the sensors 13 of the described technology must be calibrated. Hardware calibration of the motion sensing and visualization kit consists of estimating $C_d^b$, $r_{pd}^b$, $C_a^b$, and $r_{pa}^b$. Estimation of the spatial position and relative orientation, $C_a^b$, of the sensors with respect to the body coordinate system is performed, which also yields an estimate of the camera's intrinsic parameters. Estimation of the relative orientation, $C_d^b$, of the display 14 with respect to the body coordinate system is performed by an iterative process based on using an initial $C_d^b$ estimate to render scene features (e.g., edges) from camera imagery onto the display 14, and adjusting it until the rendered features align with the corresponding actual scene features when reviewed through the display 14. The position vectors $r_{pd}^b$ and $r_{pa}^b$ can be obtained by straightforward measurement, but in fact they are negligible in the context of this application, the former because $\|r_{pd}\| \ll \|r_{ps}\|$, and the latter because its magnitude is very small and was empirically determined to have negligible effect. The magnetometer 133 is also calibrated prior to each operation.

The initial state $x(0)$ is estimated by using sensor readings during the first few seconds of operation before the EKF process starts. The initial condition of all biases is set to zero.

The processing module 2 uses a number of parameter values that have been tuned experimentally prior to system use. These are values for Q, $R_k$, the initial estimated error covariance matrix P(0), and a number of parameters that are used for disturbance detection, filtering, etc. This tuning is performed by combining Allan variance analysis of sensor data with the models herein described, to identify a starting point, and then performing a series of focused field experiments.

The forward-prediction process extrapolates motion to predict the state at some time in the future, and is inherently sensitive to noise. This may result in jitter (i.e., high-frequency small-amplitude motion) of the rendered graphics even when the system is perfectly stationary (e.g., mounted on a tripod). Low-pass filtering of the rate gyro signal, $u_g$, transmitted to the processing module reduces this jitter effect but also introduces a time lag between real-world motion and motion of the corresponding symbology rendered on the display. Since this lag is not noticeable when the rotation rate is near zero, and the jitter is not noticeable when there is actual motion, in some embodiments the described technology achieves a reduction in perceived jitter by low-pass filtering the rate gyro signal only when the estimated rotation rate magnitude $\|u_g - b_g\|$ is small (e.g., less than 5 deg/s). As specified below, this is done by adjusting the low-pass filter's bandwidth using a smooth increasing function of estimated rotation rate magnitude. The adaptive gyro filtering method is implemented in the processing module of the described technology by using the discrete-time filter $\tilde{u}_{g,k} = a\tilde{u}_{g,k-1} + (1-a)u_{g,k}$ with $a = A\exp(-0.5\|u_{g,k} - b_g\|^2/\sigma_a^2)$ where $0 \leq A < 1$ and $\sigma_a > 0$ are parameters that are established prior to use (e.g., A=0.85, $\sigma_a$=0.05). The resulting filtered signal can then be used in place of $u_g$ in the EKF's time-propagation steps (i.e., in the forward-prediction process). In testing, your inventors found that this method reduces jitter by a factor of three without any adverse effects in other performance measures.

A single pose estimation processing step takes as inputs the current sensor data, the RB data, and an index $i_{now}$ corresponding to the current-time location in the RB. It returns updates to RB, $i_{now}$, and the whole FB. An example of its implementation is as follows:

```
1:   pre-process sensor data
2:   RB[i_now] ← {sensor data, pre-processed data}
3:   i_stop = i_now
4:   if vision data is available and ∃ i_vis : t_CLK in RB[i_vis] =
         t_CLK in vision data then
5:       i_now = i_vis
6:   end if
7:   keep_processing = true
8:   while keep_processing = true do
9:       {x⁻,P⁻} ← RB[i_now]
10:      RB[i_now] ← (x⁺,P⁺) = ekf_u(x⁻,P⁻,RB[i_now])
11:      i_next = i_now + 1
12:      RB[i_next] ← (x⁻,P⁻) = ekf_p(x⁺,P⁺,RB[i_now])
13:      if i_now = i_stop then
14:          FB[0] ← x⁺, FB[1] ← x⁻
15:          for k_p = 2 to N_f do
16:              {x⁻,P⁻} = ekf_p(x⁻,P⁻,RB[i_now])
17:              FB[k_p] ← x⁻
18:          end for
19:          keep_processing = false
20:      end if
21:      i_now = i_next
22:  end while
``` where $t_{CLK}$ is the reference time stamp of both sensor and vision data acquisition, and lines 10 and 12 are the EKF measurement update and prediction steps, respectively. The loop on lines 15-18 implements the forward-prediction process by repeating single EKF prediction steps.

Figure 11:
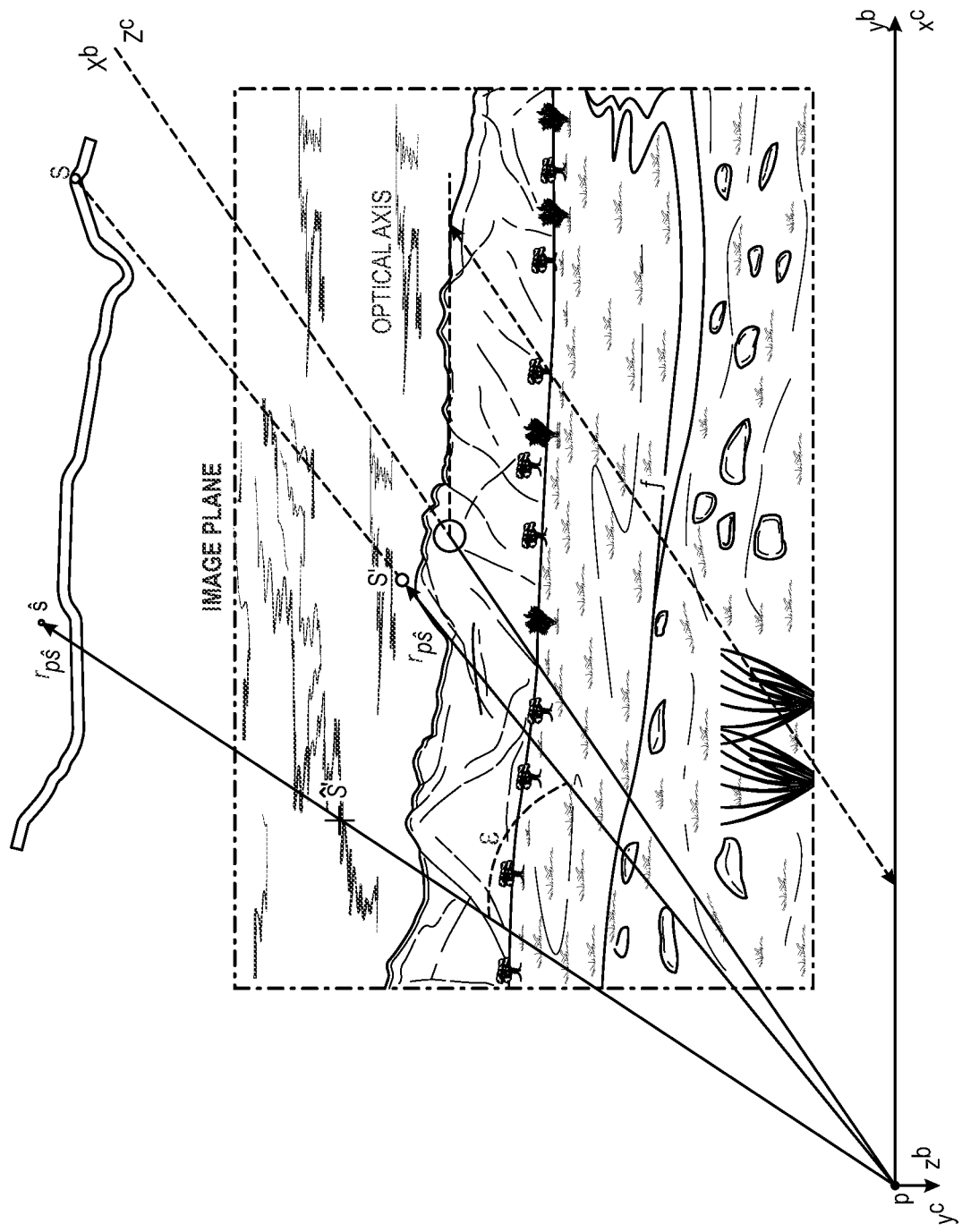
FIG. 11 depicts the geometry behind the definition of the error measure in the augmented reality application of the described technology.

Accuracy performance is based on a measure of error, $\varepsilon$, defined as the angle between the vectors $r_{ps}^b$ and $r_{p\hat{s}}^b$, as depicted in FIG. 11. The point s' is the point in the undistorted camera image corresponding to the real-world reference point s, and is obtained via semi-automatic processing (i.e., requiring some manual input) of the imagery. The vector $r_{ps}^b$ is the result of using the pose estimate, $\{p_p, C_b^n\}$, to compute $r_{ps}^b$. Note that, in addition to pose estimation errors, the process of generating the 'ground-truth' vector $r_{ps}^b$, also contributes to ε. This contribution was observed to be up to 3 mrad across a variety of experiments.

Figure 8:
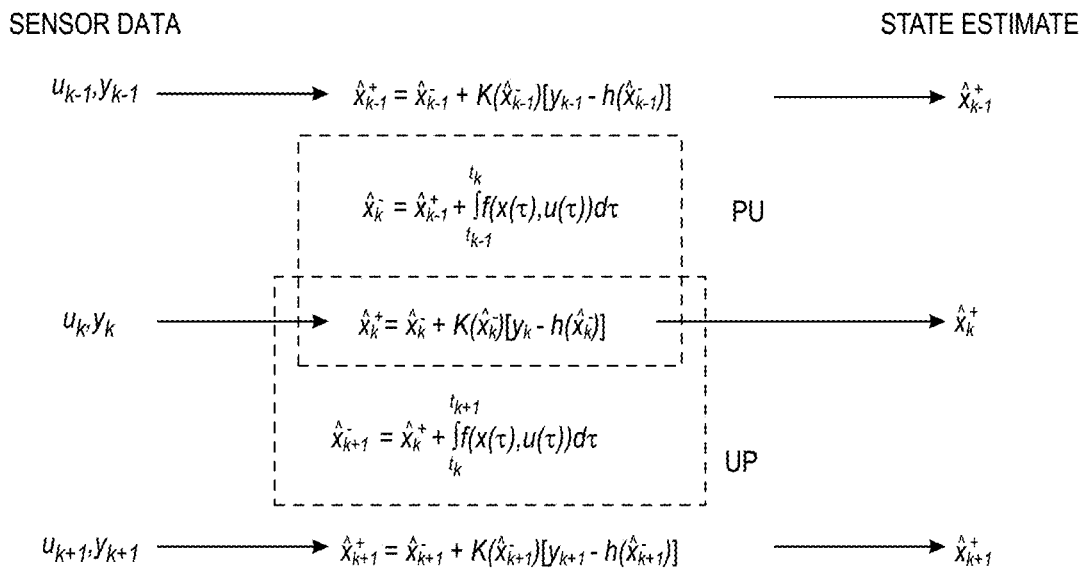
FIG. 8 depicts the predict-update (PU) cycle and the update-predict (UP) of an EKF method useful in the described technology.

EKF implementations repeatedly perform either a predict-update (PU) cycle or an update-predict (UP) cycle (shown in FIG. 8). The difference between these cycles amounts to the time of availability of the state estimate: the UP cycle implementation can produce an estimate sooner relative to the time when sensor data is available. In either case only current measurement data $y_k$ are utilized to estimate the current state (current input data $u_k$ are not).

Figure 9:
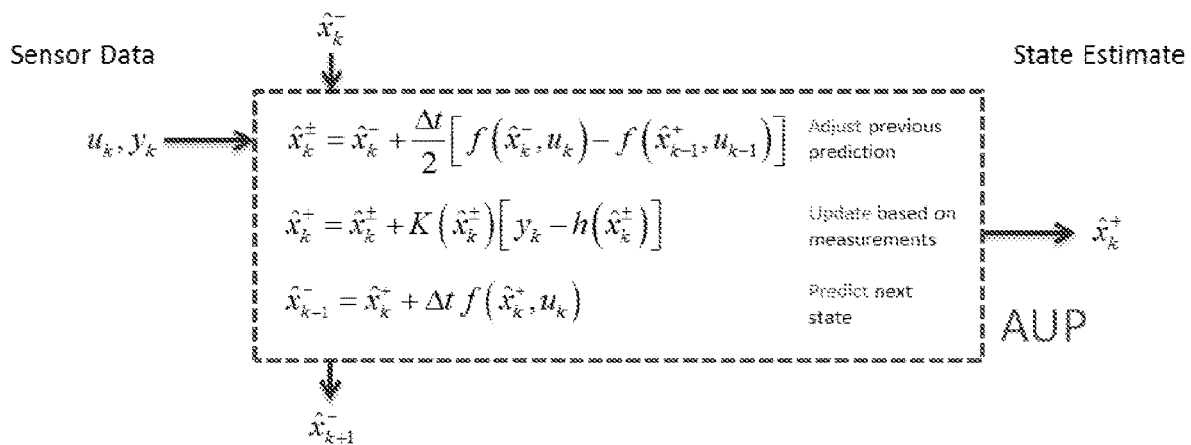
FIG. 9 depicts an adjust-update-predict cycle of an exemplary embodiment of the described technology.
Figure 10:
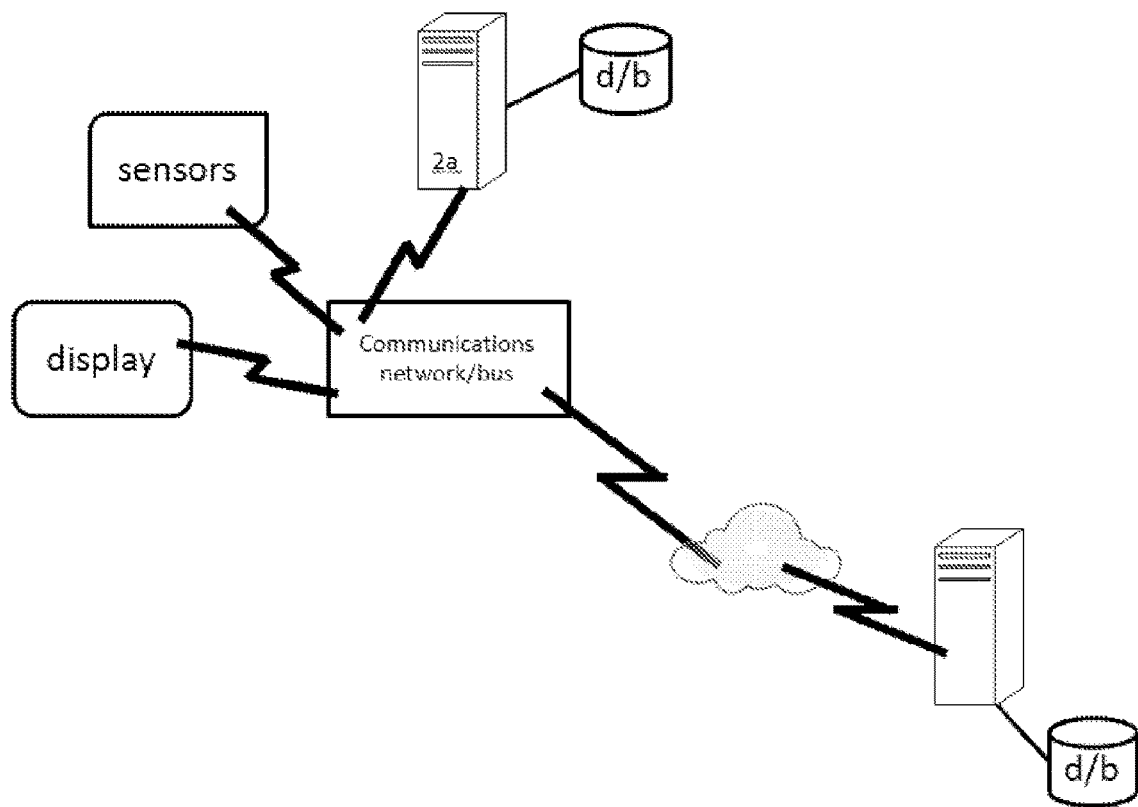
FIG. 10 is a block diagram representing an exemplary environment in which the present disclosure or parts thereof may be implemented.

In some embodiments of the described technology, the processing module or other computation means adjusts the previous prediction by including the effects of the current input data, before executing the update step. This adjust-update-predict (AUP) cycle (shown in FIG. 9) has the effect that both current measurement data $y_k$ and current input data $u_k$ are used to estimate the current state. Therefore, the AUP cycle implementation is more responsive than the UP cycle to changing input u, provides a better estimate to the update step, and requires very little additional computation.

In some applications these systems and the methods herein described combine a novel pose estimation capability and a plurality of sensors to allow rendering of geo-registered graphics on a see-through display, thereby appearing to be part of the real environment as the user looks at the environment through a display.

The pose estimation systems and methods herein described can be implemented in a wide variety of commercial and consumer applications. First-responder or search-and-rescue personnel can see geo-registered icons representing the locations of team members, search regions, and key objects of interest during mission operations. Accessing this information in a heads-up posture enables the user to perform activities more safely, with higher operational tempo, and with greater team coordination. Construction-site or warehouse foremen can view icons representing workers and material locations to help monitor safety on the worksite and to support quick decision making about resource allocation. Oil-and-gas industry workers can view graphics representing locations of structures of interest, such as underground or underwater pipelines, system safety components, and graphical representation of important system states (e.g., pressure and temperature of storage tanks and pipeline sections). Outdoor recreational enthusiasts (e.g., runners, bicyclists, hikers) can be presented with directional information, waypoints, and details about their exact position and heading when carrying out active movement while in a heads-up posture viewing the real-world environment. For immersive training applications, users can be presented with virtual avatars that appear as part of their real-world environment as they maneuver and carry out training scenarios indoors or outdoors. Such training enables the user to practice and improve scenario-specific decision making. This immersive training may be extended to sports training applications, where athletes may use augmented and/or virtual reality to enhance their training program. The pose estimation systems and methods herein may also be applied to gaming scenarios where augmented reality and/or virtual reality is used to enhance user experience and the estimation of pose of a gaming device is required. Other applications include the transportation industry, where vehicle operators may access information that appears to part of the real-world environment, and maintenance personnel may view pertinent information overlaid on the system under maintenance/repair.

Further, the pose estimation system and methods as herein described can be implemented with a variety of display technologies, including night vision goggles, see-through displays, wearable smart glasses, and smartphone or tablet devices. For smartphone or tablet style applications, the position and orientation of the smartphone or tablet is accurately tracked while the user holds the device in an upright position in their line of sight to view the real-world while 'looking through the phone'. In this video see-through application, geo-registered graphical information is superimposed on the device's camera imagery and presented to the user real-time on the device's display.

The invention claimed is:

1. One or more non-transitory computer-readable media storing computer executable instructions that, when executed by a processor, perform a method of displaying a 360-degree situational awareness display in a head-mounted display, comprising steps of:
    determining a pose azimuth based on updating a state-based estimation of an orientation of a user of the head-mounted display,
    wherein the state-based estimation of the orientation of the head-mounted display is periodically updated based upon periodically obtained absolute and relative orientation sensor data at a regular processing interval;
    displaying, on a display screen of the head-mounted display, at least a portion of the 360-degree situational awareness display and a plurality of situational awareness icons representing a plurality of points of interest,
    wherein each situational awareness icon is positioned on the 360-degree situational awareness display in a position corresponding to a bearing of an associated point of interest of the plurality of points of interest relative to the pose azimuth of the head-mounted display; and
    dynamically updating the position of at least a portion of the plurality of situational awareness icons on the 360-degree situational awareness display based on updated bearings to the plurality of points of interest as the plurality of points of interest move relative to the head-mounted display.

2. The media of claim 1, wherein the 360-degree situational awareness display is one of a situational awareness ring and a situational awareness ellipse.

3. The media of claim 1, wherein the head-mounted display is an optical see-through display.

4. The media of claim 1, the method further comprising a step of updating at least one parameter of the 360-degree situational awareness display responsive to a toggle coupled to a motion sensing element of the head-mounted display.

5. The media of claim 1, wherein at least a portion of the plurality of situational awareness icons are associated with team members of the user of the head-mounted display.

6. The media of claim 1, the method further comprising a step of displaying at least one absolute compass heading on the 360-degree situational awareness display.

7. The method of claim 1, further comprising a step of displaying a current position of the user with the 360-degree situational awareness display.

8. The media of claim 1, wherein the state-based estimation of the orientation of a user of the head-mounted display is an Extended Kalman Filter-based estimation of the orientation of the user of the head-mounted display.

9. A method of providing situation awareness information via a head-mounted display, comprising steps of:
calculating a state-based estimation of an orientation of the head-mounted display,
wherein the state-based estimation of the orientation of the head-mounted display is periodically updated based upon periodically obtained absolute and relative orientation sensor data at a regular processing interval;
determining a plurality of positions associated with a plurality of points of interest;
determining a plurality of relative bearings associated with the plurality of points of interest based on the plurality of positions and the orientation of the head-mounted display;
identifying a plurality of displayable points of interest based of the plurality of points of interest and a field of view of the head-mounted display;
displaying, on a display screen of the head-mounted display, a plurality of geo-registered icons corresponding to the plurality of displayable points of interest, wherein each of the plurality of geo-registered icons is overlaid on an associate displayable point of interest of the plurality of displayable points of interest; and
dynamically updating positions of at least a portion of the plurality of geo-registered icons on the head-mounted display based on updated relative bearings to the plurality of displayable points of interest as the plurality of points of interest move relative to the orientation of the head-mounted display.

10. The method of claim 9, further comprising steps of:
determining a pose azimuth of the head-mounted display based on the state-based estimation of an orientation of the head-mounted display; and
displaying, on the display screen of the head-mounted display, at least a portion of a 360-degree situational awareness display and a plurality of situational awareness icons representing the plurality of points of interest,
wherein each situational awareness icon is positioned on the 360-degree situational awareness display in a position corresponding to a bearing of an associated point of interest of the plurality of points of interest relative to the pose azimuth of the head-mounted display.

11. The method of claim 9, wherein the plurality of points of interest includes a movement objective destination.

12. The method of claim 9, wherein the state-based estimation of the orientation of the head-mounted display incorporates at least one of a forward buffer for predicted states and a rewind buffer for reprocessing late measurements.

13. The method of claim 9, wherein at least a portion of the plurality of geo-registered icons use MIL-STD-2525C symbology.

14. The method of claim 9, further comprising a step of displaying range information in association with at least a portion of the plurality of geo-registered icons.

15. A heads-up display system for a user, comprising:
a head-mounted display including a display screen positioned in line-of-sight of the user;
a processor;
at least one absolute orientation sensor;
at least one relative orientation sensor; and
one or more non-transitory computer-readable media storing computer-executable instructions that, when executed, cause the processor to perform a method comprising steps of:
periodically receiving absolute orientation data from the at least one absolute orientation sensor;
periodically receiving relative orientation data from the at least one relative orientation sensor;
updating, at a regular processing interval, a state-based estimation of an orientation of the head-mounted display, based upon the absolute orientation data and relative orientation data;
determining an updated pose azimuth of the head-mounted display based on the state-based estimation of the orientation of the head-mounted display, determining a plurality of positions associated with a plurality of points of interest;
displaying, on the display screen, at least a portion of a 360-degree situational awareness display and a plurality of situational awareness icons representing the plurality of points of interest,
wherein each situational awareness icon is positioned on the 360-degree situational awareness display in a position corresponding to a bearing of an associated point of interest of the plurality of points of interest relative to the updated pose azimuth of the head-mounted display;
dynamically updating the position of at least a portion of the plurality of situational awareness icons on the 360-degree situational awareness display based on updated bearings to the plurality of points of interest as the plurality of points of interest move relative to the head-mounted display;
determining a plurality of relative bearings associated with the plurality of points of interest based on the plurality of positions and the orientation of the head-mounted display;
displaying, on a display screen of the head-mounted display, a plurality of geo-registered icons corresponding to at least a portion of the plurality of points of interest,
wherein each of the plurality of geo-registered icons is overlaid on an associated point of interest of the plurality of points of interest; and
dynamically updating positions of at least a portion of the plurality of geo-registered icons on the head-mounted display based on updated relative bearings to the plurality of points of interest as the plurality of points of interest move relative to the orientation of the head-mounted display.

16. The heads-up display system of claim 15, wherein the plurality of points of interest includes at least one enemy unit of the user.

17. The heads-up display system of claim 15, wherein a shape of at least one icon of the plurality of geo-registered icons or the plurality of situational awareness icons identifies an associated point of interest.

18. The heads-up display system of claim 15, further comprising a night-vision camera, and wherein the display screen positioned in line-of-sight of the user is a video see-through display, and wherein the 360-degree situational awareness display, the plurality of situational awareness icons, and the plurality of geo-registered icons are superimposed on night-vision imagery.

19. The heads-up display system of claim 18, wherein the night-vision camera, the head-mounted display, the processor, the processor; the at least one absolute orientation sensor, the at least one relative orientation sensor, and the one or more non-transitory computer-readable media are integrated into a helmet of the user.

20. The heads-up display system of claim 15, wherein the method further comprises a step of displaying additional pertinent information in association with at least a portion of the plurality of geo-registered icons.

* * * * *